R. W. PARKER.
MODE OF DRIVING CIRCULAR SAWS.

No. 8,745.  Patented Feb. 17, 1852.

UNITED STATES PATENT OFFICE.

ROBT. W. PARKER, OF ROXBURY, MASSACHUSETTS.

BANDING PULLEYS.

Specification of Letters Patent No. 8,745, dated February 17, 1852.

*To all whom it may concern:*

Be it known that I, ROBERT W. PARKER, of Roxbury, in the county of Norfolk and State of Massachusetts, have invented a new and Improved Mode of Operating or Driving Circular Saws; and I do hereby declare that the following is a full, clear, and exact description of the construction and operation of the same, reference being had to the accompanying drawings, forming part of this specification, in which—

Figure 1:
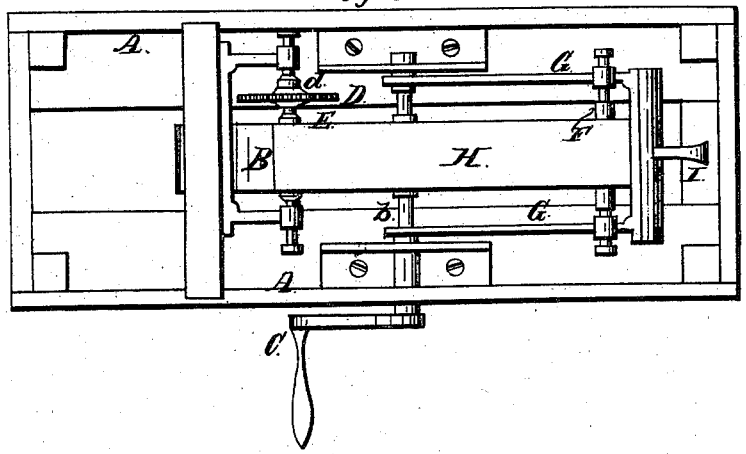
Figure 2:
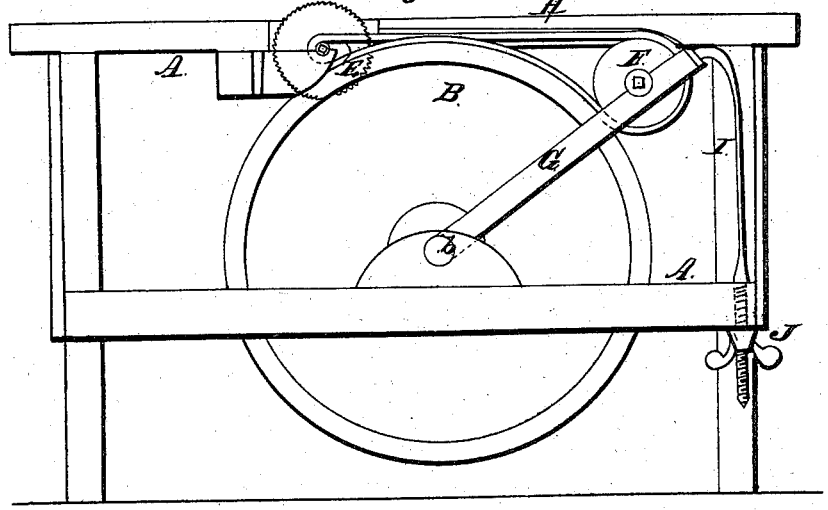

Figure 1, is a top or bird's-eye view. Fig. 2, is a side elevation with the side of the case removed.

Similar letters of reference indicate the corresponding parts in each of the several figures.

The nature of my invention consists in driving circular saws or other machinery by a peculiar arrangement of a belt and pulleys by which the main driving pulley is made to pinch the band at the points in the intermediate pulleys with any desired force. Much of the friction attendant upon the ordinary mode of driving saws and other machinery is dispensed with. The arrangement is more economical, as it is more simple, and a greater effect with the same expedition of the power is obtained.

To enable others skilled in the art to make and use my invention I will proceed to describe its construction and operation.

A, A represents a case in which the machinery is placed.

B, is a large wheel so placed as to pinch the band H, between pulleys E, and F. To the shaft $b$, is attached the crank O, by which the wheel B, is turned and motion given to the saw.

The shaft, $b$, may be hung upon friction rollers if desired and made adjustable so that the pulley B, can be made to press with any desired force against the pulleys E, and F, pinching the band at those points.

D, is the saw, upon the shaft $d$, upon which is the pulley E.

F, is a pulley hung upon the frame G, through the lower ends of which the shaft, $b$, of the wheel B, passes, the frame G, being loose upon the shaft $b$.

H, is a belt passing around the pulleys E, F, see Fig. 2.

I, is a rod, the upper end of which is attached to the top part of the frame G, and the lower end passes through a cross piece at the bottom of the case A, A′, a screw is cut upon the lower end of the rod I, on which the nut J, works. The pulley F, can also be made adjustable in the frame G, so as to press against the driving wheel B, with any desired force.

It will be seen that the saw D, is driven by the belt H, being in contact with a portion of the periphery of the large wheel B. A greater or less amount of friction is produced upon the wheel B, which presses with any desired force against the pulleys E, and F, by tightening the belt H, by raising or lowering the frame G, by turning the nut J, which works on the lower part of the rod I, and under the cross piece. This will be seen by referring to Fig. 2, by this means only one short belt is required to operate the saw, while in ordinary cases two belts are required and consequently more friction is created and an additional amount of power is required to overcome that friction.

By my arrangement I can easily get by hand power 2600 revolutions of the saw per minute and am enabled to saw through 3 inch plank by the power of one man at the crank.

Having thus described the nature and operation of my invention, what I claim as new and desire to secure by Letters Patent is—

Arranging the driving pulley B, in reference to pulleys E and F, that the band passing over these pulleys is not only pressed with any desired force against the periphery of the driver B, but is also pinched between the pulleys B, E, and B, F, they operating upon the band as feed rollers substantially in the manner herein described.

ROBT. WM. PARKER.

Witnesses:
 THOMAS BARNS,
 JOHN R. TULLES.